(12) United States Patent
Toda et al.

(10) Patent No.: US 10,723,158 B2
(45) Date of Patent: Jul. 28, 2020

(54) LIQUID DISCHARGE APPARATUS AND LIQUID DISCHARGE METHOD

(71) Applicants: Naohiro Toda, Kanagawa (JP); Takuma Nakamura, Kanagawa (JP); Yukie Inoue, Kanagawa (JP); Masaya Hamaguchi, Kanagawa (JP); Hiroyuki Yamashita, Kanagawa (JP)

(72) Inventors: Naohiro Toda, Kanagawa (JP); Takuma Nakamura, Kanagawa (JP); Yukie Inoue, Kanagawa (JP); Masaya Hamaguchi, Kanagawa (JP); Hiroyuki Yamashita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/363,319

(22) Filed: Mar. 25, 2019

(65) Prior Publication Data

US 2019/0299692 A1    Oct. 3, 2019

(30) Foreign Application Priority Data

Mar. 30, 2018 (JP) ................................. 2018-067621

(51) Int. Cl.
*B41M 5/00* (2006.01)
*B41J 11/00* (2006.01)
(Continued)

(52) U.S. Cl.
CPC .......... *B41M 5/0017* (2013.01); *B41J 11/002* (2013.01); *C09D 11/322* (2013.01); *C09D 11/54* (2013.01)

(58) Field of Classification Search
CPC .. B41M 5/0017; B41J 11/002; B41J 11/0015; C09D 11/322; C09D 11/54; C09D 11/38; C09D 11/40
See application file for complete search history.

(56) References Cited

U.S. PATENT DOCUMENTS

| 2011/0069116 A1* | 3/2011 | Ohzeki | B41J 2/1433 347/44 |
|---|---|---|---|
| 2012/0236070 A1* | 9/2012 | Okuda | C09D 11/40 347/20 |

(Continued)

FOREIGN PATENT DOCUMENTS

| JP | 2014-166713 | 9/2014 |
|---|---|---|
| JP | 2015-044351 | 3/2015 |

(Continued)

*Primary Examiner* — Sharon A. Polk
(74) *Attorney, Agent, or Firm* — Oblon, McClelland, Maier & Neustadt, L.L.P.

(57) ABSTRACT

A line head type liquid discharge apparatus includes a treatment liquid applying device, a first discharging device, a heating device, and a second discharging device. The treatment liquid applying device applies a treatment liquid to a non-permeable base material. The first discharging device discharges a first ink containing an organic solvent onto the non-permeable base material to which the treatment liquid has been applied. The heating device heats, with an infrared ray, the non-permeable base material onto which the first ink has been discharged. The second discharging device discharges a second ink containing an organic solvent onto the non-permeable base material heated by the heating device. A content ratio of the organic solvent contained in the first ink is higher than a content ratio of the organic solvent contained in the second ink.

9 Claims, 4 Drawing Sheets

(51) Int. Cl.
*C09D 11/322* (2014.01)
*C09D 11/54* (2014.01)

(56) References Cited

U.S. PATENT DOCUMENTS

| | | |
|---|---|---|
| 2013/0050363 A1 | 2/2013 | Usui et al. |
| 2014/0267520 A1 | 9/2014 | Toda et al. |
| 2014/0377516 A1 | 12/2014 | Toda et al. |
| 2015/0050467 A1 | 2/2015 | Nakagawa et al. |
| 2015/0077479 A1 | 3/2015 | Nakagawa et al. |
| 2015/0116433 A1 | 4/2015 | Fujii et al. |
| 2015/0165787 A1 | 6/2015 | Fujii et al. |
| 2015/0258783 A1 | 9/2015 | Toda et al. |
| 2015/0329731 A1 | 11/2015 | Fujii et al. |
| 2015/0361282 A1 | 12/2015 | Nakagawa et al. |
| 2016/0032122 A1 | 2/2016 | Toda et al. |
| 2016/0068697 A1 | 3/2016 | Toda et al. |
| 2017/0121545 A1 | 5/2017 | Nagashima et al. |
| 2018/0094149 A1* | 4/2018 | Katoh .................. C09D 11/322 |

FOREIGN PATENT DOCUMENTS

| | | |
|---|---|---|
| JP | 2017-002255 | 1/2017 |
| JP | 2017-013350 | 1/2017 |
| JP | 2018-138347 | 9/2018 |

* cited by examiner

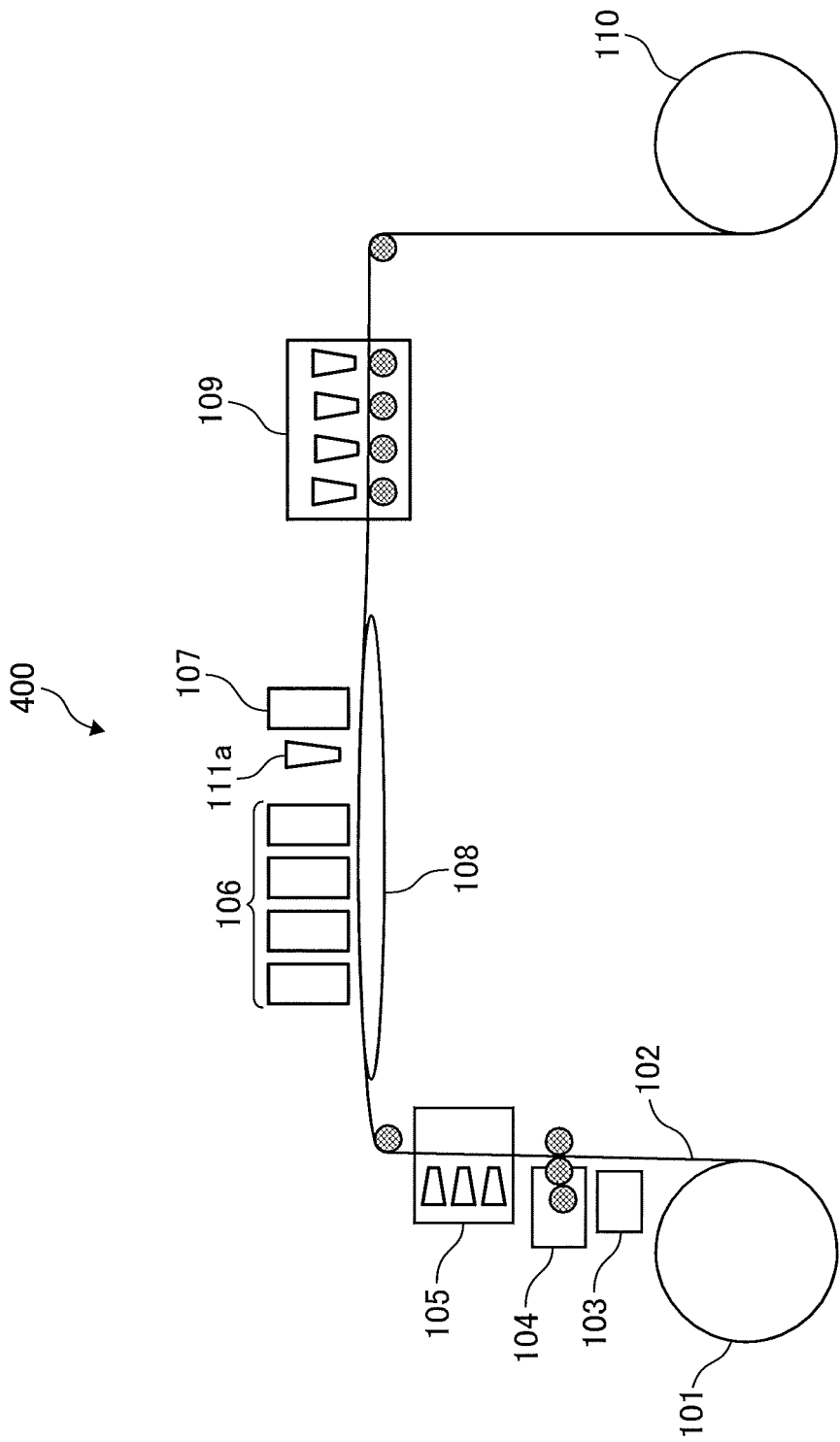

LIQUID DISCHARGE APPARATUS AND LIQUID DISCHARGE METHOD

CROSS-REFERENCE TO RELATED APPLICATION

This patent application is based on and claims priority pursuant to 35 U.S.C. § 119(a) to Japanese Patent Application No. 2018-067621, filed on Mar. 30, 2018, in the Japan Patent Office, the entire disclosure of which is incorporated by reference herein.

BACKGROUND

Technical Field

Aspects of the present disclosure relate to a liquid discharge apparatus and a liquid discharge method.

Related Art

In printing for industrial use, a method for discharging an aqueous ink onto a non-permeable base material such as a film by an inkjet recording method to form an image is known. In a field called soft packaging for manufacturing a bag using a non-permeable base material for industrial use, for example, a bag is widely manufactured by sequentially superimposing and printing a color ink and a white ink on a transparent film base material, and further bonding a laminate film to the white ink.

For example, it has been proposed to perform color printing by an inkjet method, and then to perform white printing by a gravure printing or flexographic printing method. In this case, printing is performed by connecting an inkjet printing method and a gravure printing method or by connecting an inkjet printing method and a flexographic printing method. As a result, it is unnecessary to perform platemaking of a color printing portion and to change a printing stage without deteriorating printing quality, it is unnecessary to use an organic solvent, and it is possible to print white density by a gravure printing method.

However, in soft packaging printing, there may be a restriction such as providing a transparent portion that is not printed such that the contents can be seen when processing is performed into a bag. Therefore, it may be necessary to manufacture a plate for a white ink according to a printed image. Therefore, it is desired to perform printing by an inkjet method also for a white ink.

Furthermore, in a case where a white ink is superimposed on a color ink by an inkjet method, bonding strength (hereinafter referred to as laminate strength) between a printing base material and a laminate film when the laminate film is bonded to the white ink is likely to be lowered, and opening performance of a bag may be deteriorated disadvantageously.

SUMMARY

In an aspect of the present disclosure, there is provided a line head type liquid discharge apparatus that includes a treatment liquid applying device, a first discharging device, a heating device, and a second discharging device. The treatment liquid applying device applies a treatment liquid to a non-permeable base material. The first discharging device discharges a first ink containing an organic solvent onto the non-permeable base material to which the treatment liquid has been applied. The heating device heats, with an infrared ray, the non-permeable base material onto which the first ink has been discharged. The second discharging device discharges a second ink containing an organic solvent onto the non-permeable base material heated by the heating device. A content ratio of the organic solvent contained in the first ink is higher than a content ratio of the organic solvent contained in the second ink.

In another aspect of the present disclosure, there is provided a line head type liquid discharge method that includes applying a treatment liquid to a non-permeable base material; discharging a first ink containing an organic solvent onto the non-permeable base material to which the treatment liquid has been applied; heating, with an infrared ray, the non-permeable base material onto which the first ink has been discharged; and discharging a second ink containing an organic solvent onto the non-permeable base material heated by the heating. A content ratio of the organic solvent contained in the first ink is higher than a content ratio of the organic solvent contained in the second ink.

BRIEF DESCRIPTION OF THE DRAWINGS

The aforementioned and other aspects, features, and advantages of the present disclosure would be better understood by reference to the following detailed description when considered in connection with the accompanying drawings, wherein:

FIG. 4 is a schematic side view illustrating a liquid discharge apparatus in Comparative Example.

Figure 1:
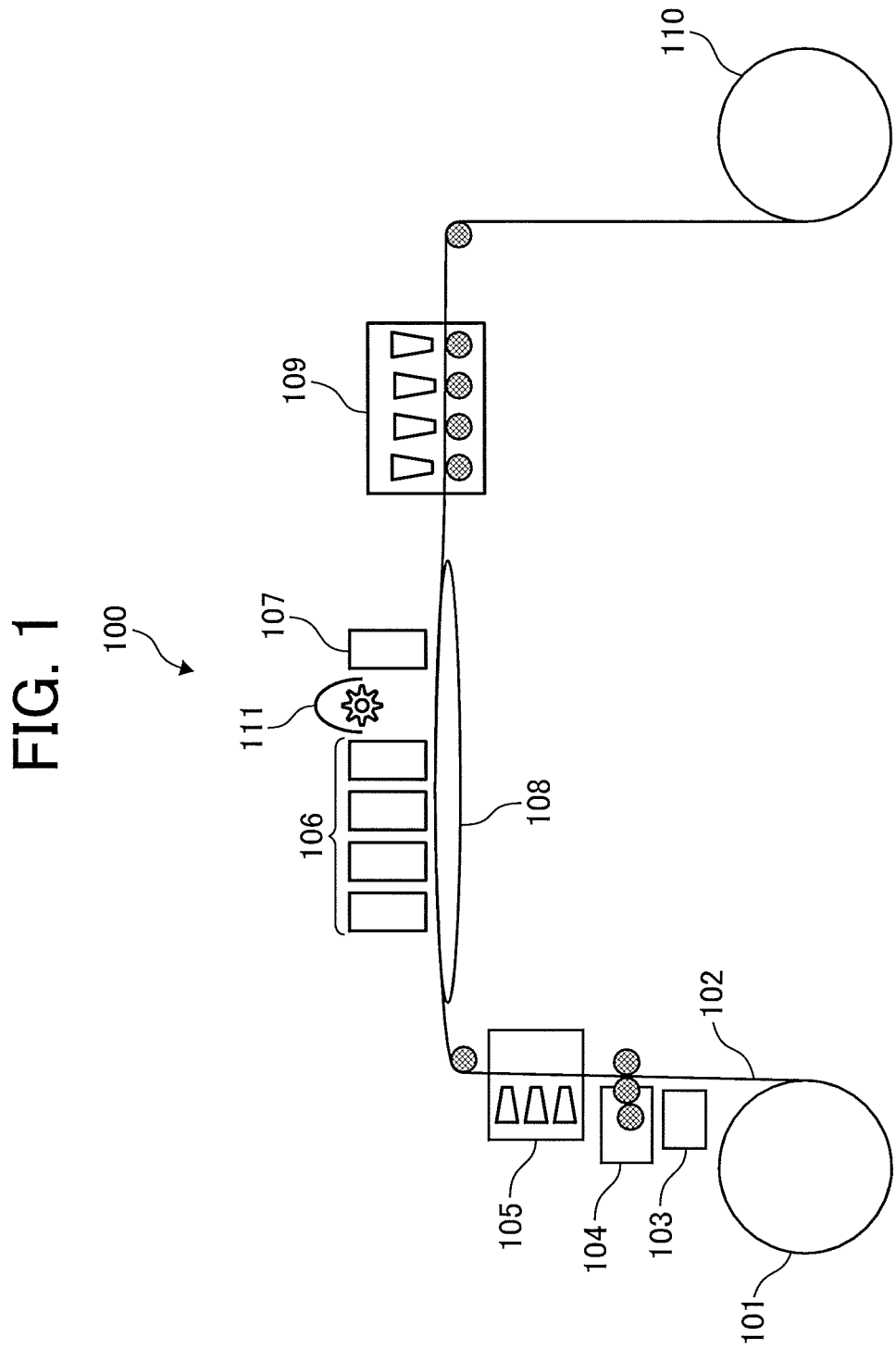
FIG. 1 is a schematic side view illustrating an example of a liquid discharge apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

Hereinafter, a liquid discharge apparatus and a liquid discharge method according to an embodiment of the present disclosure will be described with reference to the drawings. Note that embodiments of the present invention are not limited to the embodiments described below but can be changed within a range which a person skilled in the art can conceive of, for example, by another embodiment, addition, modification, or deletion. Any aspect is included in the scope of the present disclosure as long as exhibiting an action and an effect of an embodiment of the present disclosure.

(Liquid Discharge Apparatus and Liquid Discharge Method)

A liquid discharge apparatus according to an embodiment of the present disclosure is a line head type liquid discharge apparatus including: a treatment liquid applying device to apply a treatment liquid to a non-permeable base material; a first discharging device to discharge a first ink containing an organic solvent onto the non-permeable base material to which the treatment liquid has been applied; a first heating device to heat the non-permeable base material onto which the first ink has been discharged with an infrared ray; and a second discharging device to discharge a second ink containing an organic solvent onto the heated non-permeable base material. The liquid discharge apparatus may include other units/steps if necessary. For example, the liquid discharge apparatus may include a conveyor to convey a non-permeable base material, a unit involved in supplying, conveying, and discharging the non-permeable base material, or a heating device other than the above-described heating device. Besides these devices, the liquid discharge apparatus may include a pretreatment device, a post-treatment device, and the like.

A liquid discharge method according to an embodiment of the present disclosure is a line head type liquid discharge method including: a treatment liquid applying step of applying a treatment liquid to a non-permeable base material; a first discharging step of discharging a first ink containing an organic solvent onto the non-permeable base material to which the treatment liquid has been applied; a first heating step of heating the non-permeable base material onto which the first ink has been discharged with an infrared ray; and a second discharging step of discharging a second ink containing an organic solvent onto the heated non-permeable base material. The liquid discharge method may include other units/steps if necessary. For example, the liquid discharge method may include a corona treatment step, a conveying step for conveying a non-permeable base material, a step involved in supplying, conveying, and discharging the non-permeable base material, or a heating step other than the above-described heating step. Besides these steps, the liquid discharge method may include a pretreatment step, a post-treatment step, and the like.

According to the present embodiment, excellent image quality and laminate strength can be obtained, and in particular, the present invention is suitably used for soft packaging printing.

In the present embodiment, the line head type liquid discharge apparatus means a liquid discharge apparatus in which an arrangement direction of nozzles is orthogonal to a conveying direction of a non-permeable base material. The line head type liquid discharge method means a liquid discharge method in which an arrangement direction of nozzles is orthogonal to a conveying direction of a non-permeable base material.

A liquid discharge apparatus according an embodiment of the present disclosure will be described with reference to FIG. 1. FIG. 1 is a schematic side view illustrating the liquid discharge apparatus according to the present embodiment. A liquid discharge apparatus 100 according to the present embodiment is a line head type inkjet recording apparatus, and is a full line type (hereinafter also referred to as "line type").

In the present embodiment, the first ink is a color ink, and the second ink is a white ink.

The liquid discharge apparatus 100 includes a feeding device 101, a non-permeable base material 102, a corona treatment device 103, a treatment-liquid applying device 104 (treatment liquid applying device), a treatment-liquid drying device 105, a color ink inkjet discharge head 106 (first ink discharging device), a white ink inkjet discharge head 107 (second ink discharging device), an infrared heater 111 (first heating device), a platen 108, an ink drying device 109, and a winding device 110.

Hereinafter, each of the units and steps will be described.

<Feeder/Feeding Step and Winder/Winding Step>

The feeding device 101 and the winding device 110 are used for feeding and winding the non-permeable base material 102, respectively, in the present embodiment.

The feeding device 101 is rotationally driven to supply the non-permeable base material 102 stored in a roll shape to a conveying path in a recording apparatus 100.

The winding device 110 rotationally drives the non-permeable base material 102 on which an image is formed by applying an ink to wind and store the non-permeable base material 102 therein in a roll shape.

The non-permeable base material 102 in the present embodiment is a film-shaped base material continuous in a conveying direction of the liquid discharge apparatus, and is conveyed along a conveying path between the feeding device 101 and the winding device 110. The length of the non-permeable base material 102 in the conveying direction is at least longer than the conveying path between the feeding device 101 and the winding device 110. As described above, by using a base material continuous in the conveying direction of the recording apparatus, it is possible to continuously perform printing for a long time.

<Corona Treatment Unit/Corona Treatment Step>

A corona treatment unit performs a corona treatment on the non-permeable base material 102 by corona discharge to modify a surface of the non-permeable base material 102. As the corona treatment unit in the present embodiment, the corona treatment device 103 is illustrated.

The corona treatment step is a step of performing a corona treatment on the non-permeable base material 102 which has been conveyed through a step of feeding the non-permeable base material 102 by corona discharge to perform surface modification.

The corona treatment is not essential but does not have to be performed. However, by performing the corona treatment prior to a treatment liquid applying step, adhesion of a surface treatment layer to the non-permeable base material 102 is improved, and therefore the corona treatment is preferably performed. Instead of the corona treatment, an atmospheric pressure plasma treatment, a frame treatment, an ultraviolet irradiation treatment, and the like may be performed.

As a unit for performing the corona treatment, various known units can be used. Various conditions (discharge amount and the like) in a case of performing the corona treatment are not particularly limited, and can be appropriately changed.

<Treatment Liquid Applying Device/Treatment Liquid Applying Step>

The treatment liquid applying device applies a treatment liquid to the non-permeable base material 102. The treatment-liquid applying device 104 is illustrated as the treatment liquid applying device in the present embodiment. The treatment-liquid applying device 104 rotationally drives a roller to which a treatment liquid has been attached so as to come into contact with the non-permeable base material 102 to apply the treatment liquid to a surface of the non-permeable base material 102.

Incidentally, hereinafter, the treatment liquid may also be referred to as a surface treatment liquid or the like.

Examples of a unit for applying a treatment liquid include a unit for bringing a roller to which the treatment liquid has been attached into contact with the non-permeable base material 102. However, embodiments of the present disclosure are not limited thereto. Examples thereof further include various known units such as spin coating, spray coating, gravure roll coating, reverse roll coating, bar coating, and inkjet.

The treatment liquid applying step applies a treatment liquid to the non-permeable base material 102. In the present embodiment, a treatment liquid is applied to the non-permeable base material 102 which has been conveyed through a step of feeding the non-permeable base material 102.

By applying the treatment liquid to the non-permeable base material 102, a treatment layer (also referred to as a surface treatment layer or the like) is formed on the non-permeable base material 102. Note that formation of the treatment layer is promoted by performing heating after the treatment liquid is applied.

By applying the treatment liquid, occurrence of color boundary bleeding or the like of an image formed by a color ink can be suppressed, and a good image can be obtained. In a case where the treatment liquid contains a flocculant, a coloring material contained in a color ink reacts with the flocculant, and the coloring material can be flocculated on a treatment layer. Therefore, occurrence of color boundary bleeding or the like of an image formed by the color ink can be further suppressed, and an excellent image can be obtained.

The application amount of the treatment liquid to the non-permeable base material 102 is not particularly limited, but is preferably 0.01 g/m$^2$ or more and 2.0 g/m$^2$ or less, and more preferably 0.02 g/m$^2$ or more and 1.6 g/m$^2$ or less. When the application amount is 0.01 g/m$^2$ or more, the coloring material is more easily flocculated. In addition, when the application amount is 2.0 g/m$^2$ or less, drying time of the treatment liquid can be shortened, and therefore recording can be performed at a higher speed.

<First Discharging Device and Second Discharging Device/First Discharging Step and Second Discharging Step>

The first discharging device/first discharging step is a unit/step of discharging the first ink (color ink) onto a non-permeable base material to which a treatment liquid has been applied.

The second discharging device/second discharging step is a unit/step of heating the non-permeable base material onto which the first ink (color ink) has been discharged and then discharging the second ink (white ink) thereonto.

Note that the first discharging device and the second discharging device may be referred to as ink applicators, and the first discharging step and the second discharging step may be referred to as ink applying steps.

In the present embodiment, as illustrated in FIG. 1, a color ink inkjet discharge head 106 is used as the first discharging device, and a white ink inkjet discharge head 107 is used as the second discharging device.

The color ink inkjet discharge head 106 includes a plurality of nozzle rows in which a plurality of nozzles is arranged, and is disposed such that a discharge direction of an ink from the nozzles faces the non-permeable base material 102. As a result, the inkjet discharge head 106 sequentially discharges liquids of colors of magenta (M), cyan (C), yellow (Y), and black (K) onto a surface treatment layer on the non-permeable base material 102. Note that order of discharge can be appropriately changed.

The white ink inkjet discharge head 107 is disposed on a downstream side of the inkjet discharge head 106. By superimposing a white ink on a color ink, visibility of a printed matter is improved on a surface of a transparent non-permeable base material.

The inkjet discharge heads 106 and 107 in the present embodiment are line type (full line type) inkjet discharge heads. The "line type inkjet discharge head" is an inkjet discharge head in which nozzles for discharging an ink are arranged over the entire width in a conveying direction of the non-permeable base material 102, and the nozzles are arranged such that the arrangement direction of the nozzles is orthogonal to the conveying direction of the non-permeable base material 102. Note that the width of the inkjet discharge head may be changed as long as the effect of the present embodiment is not impaired.

In printing for industrial use, it is necessary to perform a large amount of printing at a high speed. Therefore, an inkjet recording method using a line type inkjet discharge head as illustrated in FIG. 1 is preferable. Meanwhile, printing for industrial use is continuously performed for a long time. Therefore, in a case where a line type head is used, an ink is dried in some nozzles where discharge of an ink is not performed for a long time, and discharge failure may occur.

Therefore, in the ink applying step, in a nozzle that does not discharge an ink, an interface of the ink in the nozzle is preferably vibrated. By vibrating the interface of the ink in the nozzle, it is possible to make the ink in the nozzle and the ink in an ink channel in an inkjet discharge head such as a pressure chamber communicating with the nozzle uniform, and it is possible to suppress drying of the ink in the nozzle. This makes it possible to further suppress generation of an abnormal image due to discharge failure. Note that the interface of the ink in the nozzle is an interface of the ink in contact with the atmosphere or a gas.

In the inkjet discharge heads 106 and 107, a unit for applying a stimulus to an ink to discharge the ink may be appropriately selected according to a purpose, and examples thereof include a pressurizing device, a piezoelectric element, a vibration generating device, an ultrasonic oscillator, and a light. Specific examples thereof include a piezoelectric actuator such as a piezoelectric element, a shape memory alloy actuator using a change in metallic phase due to a change in temperature, and an electrostatic actuator using electrostatic force.

Among these units, in particular, it is preferable to use a unit for applying a voltage to a piezoelectric element bonded to a position called a pressure chamber (also referred to as a liquid chamber or the like) in an ink channel in the inkjet discharge head to bend the piezoelectric element, reducing the volume of the pressure chamber to pressurize the ink in the pressure chamber, and discharging the ink as droplets from the nozzles of the inkjet discharge head.

In such a plurality of nozzles capable of discharging an ink, in some nozzles that do not discharge an ink due to the shape of an image to be formed, such a minute voltage that does not cause discharge of an ink is preferably applied to the piezoelectric element to vibrate the interface of the ink in the nozzles.

By applying the treatment liquid and then discharging a color ink, occurrence of color boundary bleeding or the like of an image can be suppressed, and a good image can be obtained. In a case where the treatment liquid contains a flocculant, by applying the treatment liquid and then discharging a color ink, the flocculant in the treatment layer and a coloring material in the color ink are flocculated while the color ink spreads in a wet state. Therefore, generation of streaks in an image can be suppressed, occurrence of color boundary bleeding or the like of an image can be further suppressed, and a better image can be obtained.

Although related to other steps, the printing speed in the liquid discharge apparatus and the liquid discharge method in the present embodiment is preferably 30 m/min to 100 m/min. In this case, the liquid discharge apparatus and the liquid discharge method can be suitably used for industrial use requiring high-speed printing.

<Conveyor and Conveying Step>

The platen 108 guides the non-permeable base material 102 so as to be conveyed along a conveying path. In addition, a conveying roller or the like not denoted by a reference sign is also used as a conveyor.

<First Heating Device/First Heating Step>

The first heating device heats the non-permeable base material onto which the first ink (color ink) has been discharged with an infrared ray. The first heating step heats the non-permeable base material onto which the first ink (color ink) has been discharged with an infrared ray.

Note that the first heating device and the first heating step perform heating after discharge of the first ink (color ink) before discharge of the second ink (white ink), and therefore may also be referred to as an intercolor dryer and an intercolor drying step, respectively.

As illustrated in FIG. 1, an infrared heater 111 (intercolor drying device) is used as the first heating device in the present embodiment. The infrared heater 111 heats the non-permeable base material 102 onto which the color ink has been discharged with an infrared ray. The infrared heater 111 is disposed between the color ink inkjet discharge head 106 and the white ink inkjet discharge head 107.

In the present embodiment, by discharging a color ink onto the non-permeable base material to which a treatment liquid has been applied and then heating the non-permeable base material with an infrared ray before a white ink is superimposed thereon, it is possible to suppress a decrease in laminate strength between the non-permeable base material and a laminate film.

The following is presumed as a factor thereof. A treatment layer on the non-permeable base material 102 has a function of improving adhesion between the non-permeable base material 102 and an ink component in addition to a flocculation function of the color ink. However, in a case where the white ink is superimposed in a state in which a large amount of a solvent component contained in the color ink remains, the solvent component permeates the treatment layer together with a solvent component in the white ink, and the surface treatment layer is easily dissolved.

Therefore, in the present embodiment, the solvent remaining in the color ink is heated and dried by the infrared heater 111 before discharge of the white ink. This makes it possible to prevent dissolution of the surface treatment layer when the color ink and the white ink are superimposed and printed on the surface treatment layer formed on the non-permeable base material 102, and it is estimated that laminate strength can be obtained.

Heating with an infrared ray makes radiant heating of an ink surface on the non-permeable base material 102 possible, does not have an influence such as promoting drying of the ink in the inkjet discharge head unlike warm air drying or the like, and is preferable.

Note that the maximum output wavelength of the radiation infrared ray in the infrared heater 111 is not particularly limited, but is preferably 2.5 to 3.5 µm, for example.

Meanwhile, in a case where heating with an infrared ray is not performed, desired laminate strength cannot be obtained. In a case where a heating device other than the infrared ray is used instead of heating with the infrared ray, in addition to not obtaining desired laminate strength, the ink in the inkjet discharge head is affected, drying of the ink in the head is promoted, and it is difficult to obtain a good image. Note that FIG. 4 is a view illustrating an example of a case where a warm-air blowing device 111*a* is used instead of the infrared heater as the first heating device.

<Second Heating Device/Second Heating Step>

A second heating device heats the non-permeable base material onto which the second ink (white ink) has been discharged. A second heating step heats the non-permeable base material onto which the second ink (white ink) has been discharged.

Note that the second heating device and the second heating step are also referred to as an ink dryer and an ink drying step, respectively.

As illustrated in FIG. 1, the ink drying device 109 is used as the second heating device in the present embodiment. The ink drying device 109 heats the non-permeable base material 102 onto which the white ink has been discharged, and is disposed on a downstream side of the white ink inkjet discharge head 107.

In the second heating step, conditions such as heating temperature and heating time can be appropriately changed. However, for example, heating is preferably performed to such a degree that the non-permeable base material is not sticky.

The ink drying device 109 in the present embodiment blows warm air onto the non-permeable base material 102 to dry the non-permeable base material 102. The second heating device is not limited to a unit for blowing warm air, but examples thereof include a unit for bringing a back surface of the non-permeable base material 102 into contact with a heating roller, a flat heater, or the like and drying the non-permeable base material 102 and a unit combining heating the back surface with a unit for blowing warm air from a printed surface side.

Figure 2:
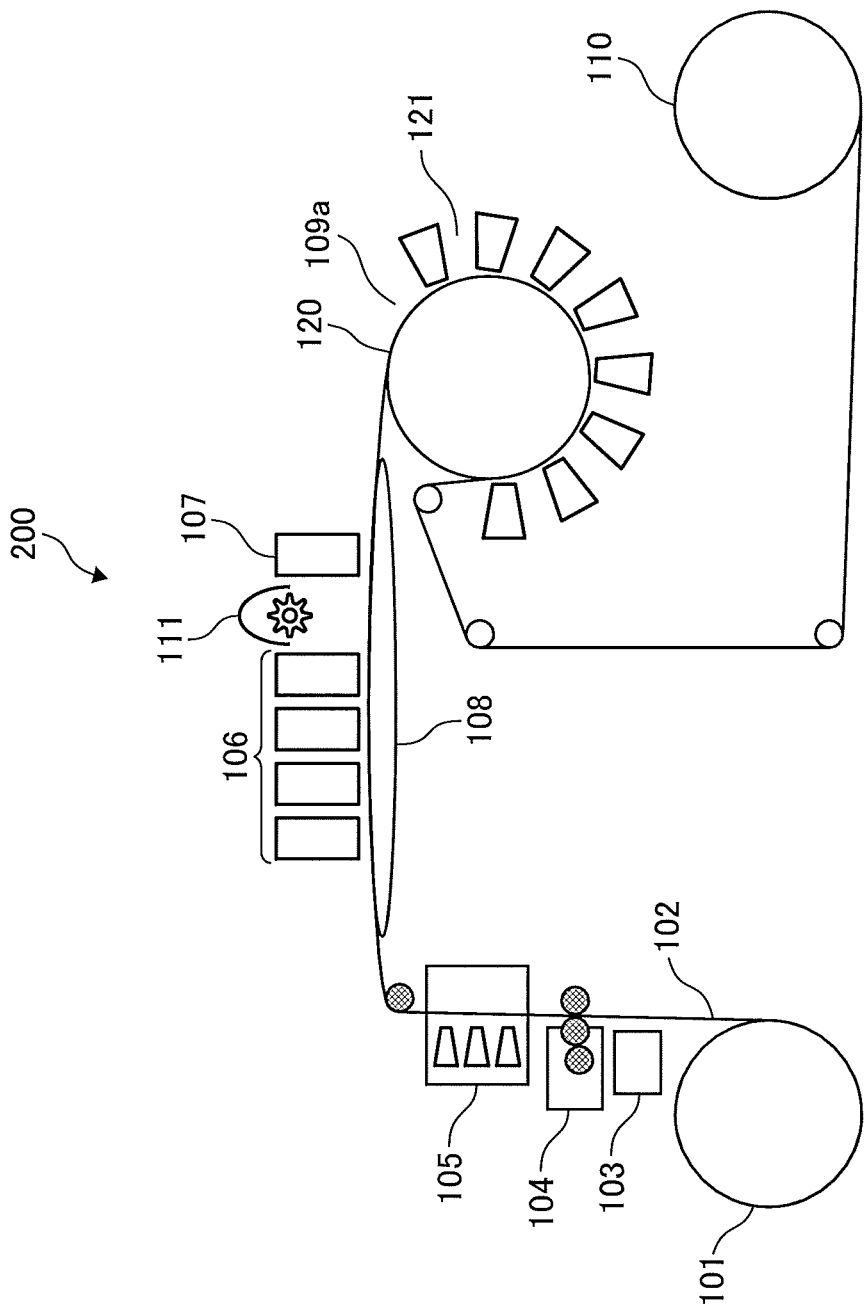
FIG. 2 is a schematic side view illustrating another example of a liquid discharge apparatus according to an embodiment of the present disclosure.

Another embodiment of the present disclosure is illustrated in FIG. 2. FIG. 2 is a view similar to FIG. 1. However, in the embodiment of FIG. 2, as an ink drying device 109*a* (second heating device), a drum 120 having a surface temperature that can be adjusted and a warm-air blowing device 121 facing the drum 120 via a non-permeable base material 102 are used. The present embodiment makes it possible to suppress elongation of the non-permeable base material 102 and to effectively suppress permeation of a solvent component of an ink into a treatment layer, and is particularly preferable. This makes it possible to further improve the laminate strength.

In the present embodiment, the drum 120 performs heating while being in contact with a back surface of the non-permeable base material 102, that is, the opposite surface to a surface to which a treatment liquid and an ink are applied.

A plurality of the warm-air blowing devices 121 in the present embodiment is disposed at positions facing the drum 120, and blows warm air onto a printed surface, that is, a surface to which a treatment liquid and an ink are applied to perform heating. Note that the positions, the number, and the like of the warm-air blowing devices 121 can be appropriately changed.

In the present embodiment, the temperature of the warm-air blowing devices 121 is preferably higher than the surface temperature of the drum 120. In this case, the laminate strength over time can be further improved.

<Third Heating Device/Third Heating Step>

A third heating device heats the non-permeable base material 102 to which a treatment liquid has been applied before discharge of a color ink. A third heating step heats the non-permeable base material 102 to which a treatment liquid has been applied before discharge of a color ink.

Note that the third heating device and the third heating step are also referred to as a treatment liquid heating device and a treatment liquid heating step, respectively.

As the third heating device in the present embodiment, a warm air blower 105 is used. By performing heating with the treatment liquid heating device, the treatment liquid that has been applied to a surface of the non-permeable base material 102 is heated and dried to promote formation of a treatment layer.

In the present embodiment, heating is performed by blowing warm air, but embodiments of the present disclosure are not limited thereto. Examples thereof include a unit for emitting an infrared ray and a unit for bringing a back surface of the non-permeable base material 102 into contact with a heating roller, a flat heater, or the like and drying the non-permeable base material 102. Natural drying may be performed without using a special dryer.

Figure 3:
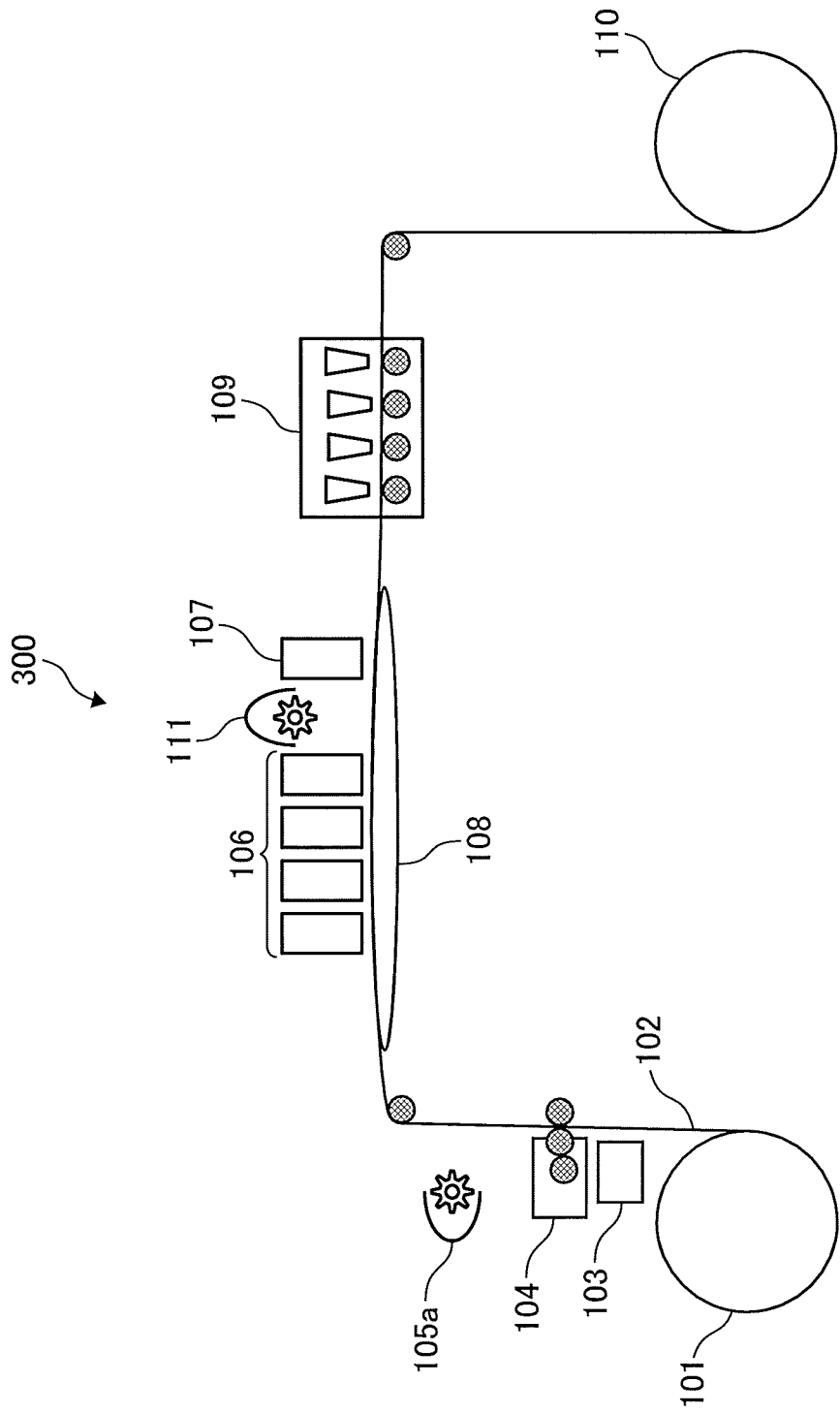
FIG. 3 is a schematic side view illustrating another example of a liquid discharge apparatus according to an embodiment of the present disclosure.

Another embodiment of the present disclosure is illustrated in FIG. 3. FIG. 3 is a view similar to FIG. 1. However, in the embodiment of FIG. 3, an infrared heater 105a is used as the third heating device. By using the infrared heater, a solvent can be sufficiently removed even from the inside of a treatment layer. This makes it possible to prevent elution of a component of the treatment layer into a solvent contained in an ink when the ink is applied onto the treatment layer, and is particularly effective.

(Non-Permeable Base Material)

The non-permeable base material refers to a base material having a surface with low water permeability, absorbency, and/or adsorption, and also includes a base material not opening to the outside even if having many cavities therein. More quantitatively, the non-penneable base material refers to a base material having a water absorption amount of 10 mL/m$^2$ or less from contact start until a time point of 30 msec$^{1/2}$ in a Bristow method.

Among non-permeable base materials, a polypropylene film, a polyethylene terephthalate film, and a nylon films are particularly preferable because an ink is attached thereto well.

Examples of the polypropylene film include P-2002, P-2161, and P-4166 manufactured by Toyobo Co., PA-20, PA-30, and PA-20W manufactured by SUNTOX Corporation, and FOA, FOS, and FOR manufactured by Futamura Chemical Co., Ltd.

Examples of the polyethylene terephthalate film include E-5100 and E-5102 manufactured by Toyobo Co., Ltd., P60 and P375 manufactured by Toray Industries, and G2, G2P2, K, and SL manufactured by Teijin DuPont Films Japan Ltd.

Examples of the nylon film include Harden Film N-1100, N-1102, and N-1200 manufactured by Toyobo Co., Ltd., and ON, NX, MS, and NK manufactured by Unitika Ltd.

(Treatment Liquid)

The treatment liquid (also referred to as a surface treatment liquid) that is applied to the non-permeable base material to form a treatment layer contains at least an organic solvent, contains a polyvalent metal compound, a resin, water, a surfactant, and the like if necessary, and may further contain another component.

<Organic Solvent>

The organic solvent used for the treatment liquid is not particularly limited, and a water-soluble organic solvent can be used. Examples thereof include a polyhydric alcohol, an ether such as a polyhydric alcohol alkyl ether or a polyhydric alcohol aryl ether, a nitrogen-containing heterocyclic compound, an amide, an amine, and a sulfur-containing compound.

Specific examples of the polyhydric alcohol include ethylene glycol, diethylene glycol, 1,2-propanediol, 1,3-propanediol, 1,2-butanediol, 1,3-butanediol, 1,4-butanediol, 2,3-butanediol, 3-methyl-1,3-butanediol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butanetriol, 1,2,3-butanetriol, 2,2,4-trimethyl-1,3-pentanediol, and petriol.

Examples of the polyhydric alcohol alkyl ether include a polyhydric alcohol alkyl ether such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, or propylene glycol monoethyl ether.

Examples of the polyhydric alcohol aryl ether include ethylene glycol monophenyl ether and ethylene glycol monobenzyl ether.

Examples of the nitrogen-containing heterocyclic compound include 2-pyrrolidone, N-methyl-2-pyrrolidone, N-hydroxyethyl-2-pyrrolidone, 1,3-dimethyl-2-imidazolidinone, ε-caprolactam, and γ-butyrolactone.

Examples of the amide include formamide, N-methylformamide, N,N-dimethylformamide, 3-methoxy-N,N-dimethylpropionamide, and 3-butoxy-N,N-dimethylpropionamide.

Examples of the amine include monoethanolamine, diethanolamine, and triethylamine.

Examples of the sulfur-containing compound include dimethyl sulfoxide, sulfolane, and thiodiethanol.

Examples of other organic solvents include propylene carbonate and ethylene carbonate.

It is preferable to use an organic solvent having a boiling point of 250° C. or lower because the organic solvent not only functions as a wetting agent but also provides a good drying property.

The content of the organic solvent in the treatment liquid is not particularly limited and may be appropriately selected according to a purpose, but is preferably 5% by mass or more and 60% by mass or less, and more preferably 5% by mass or more and 50% by mass or less.

<Polyvalent Metal Compound>

Examples of the polyvalent metal compound include a titanium compound, a chromium compound, a copper compound, a cobalt compound, a strontium compound, a barium compound, an iron compound, an aluminum compound, a calcium compound, a magnesium compound, a nickel compound, and salts thereof (polyvalent metal salts).

Among these compounds, at least one selected from the group consisting of a calcium compound, a magnesium compound, a nickel compound, and salts thereof is preferable. In particular, in a case where the polyvalent metal compound is a salt of a calcium compound (calcium salt), stability of the treatment liquid is better.

Specific examples of the polyvalent metal compound include calcium carbonate, calcium nitrate, calcium chloride, calcium acetate, calcium sulfate, magnesium chloride, magnesium acetate, magnesium sulfate, barium sulfate, zinc sulfide, zinc carbonate, aluminum silicate, calcium silicate, magnesium silicate, and aluminum hydroxide. Among these compounds, calcium acetate is preferable.

The concentration of the polyvalent metal compound with respect to the total amount of the treatment liquid is preferably 0.05 mol/kg or more and 0.5 mol/kg or less. When the concentration is within this range, excellent storage stability can be obtained, and excellent ink flocculation function can be obtained.

<Resin>

The resin is preferably at least one selected from the group consisting of a polyolefin resin, a polyvinyl acetate resin, a polyvinyl chloride resin, a urethane resin, a styrene butadiene resin, and a copolymer of these resins because the treatment layer has strong adhesion to various non-permeable base materials. The resin is more preferably an ethylene-vinyl acetate copolymer resin, an ethylene-vinyl acetate-vinyl chloride copolymer resin, or an olefin-modified urethane resin. The resin is preferably in a form of resin particles dispersible in water. The resin preferably contains a nonionic aqueous emulsion.

The addition amount of the resin is preferably 0.5% by mass or more and 20% by mass or less as a solid content with respect to the total amount of the treatment liquid. When the content is 0.5% by mass or more, the resin can sufficiently coat the non-permeable base material. Therefore, adhesion of the treatment layer to the non-permeable base material is improved, and bleeding of ink droplets can be suppressed. When the content is 20% by mass or less, the film thickness of the treatment layer does not become too thick. Therefore, deterioration of adhesion is suppressed.

<Water>

The content of water in the surface treatment liquid is not particularly limited and may be appropriately selected according to a purpose, but is preferably 10% by mass or more and 90% by mass or less, more preferably 50% by mass or more and 90% by mass or less, and particularly preferably 60% by mass or more and 90% by mass or less.

<Surfactant>

As the surfactant, any of a silicone-based surfactant, a fluorine-based surfactant, an amphoteric surfactant, a nonionic surfactant, and an anionic surfactant can be used.

The silicone-based surfactant is not particularly limited and may be appropriately selected according to a purpose. Among these surfactants, a surfactant that does not decompose even at high pH is preferable. Examples of the silicone-based surfactant include a side chain-modified polydimethylsiloxane, a both-terminal-modified polydimethylsiloxane, a single terminal-modified polydimethylsiloxane, and a side chain both-terminal-modified polydimethylsiloxane. A surfactant having a polyoxyethylene group or a polyoxyethylene polyoxypropylene group as a modification group is particularly preferable because of exhibiting a good property as an aqueous surfactant. As the silicone-based surfactant, a polyether-modified silicone-based surfactant can also be used, and examples thereof include a compound in which a polyalkylene oxide structure is introduced into a side chain of an Si moiety of dimethylsiloxane.

As the fluorine-based surfactant, for example, a perfluoroalkylsulfonic acid compound, a perfluoroalkylcarboxylic acid compound, a perfluoroalkylphosphate compound, a perfluoroalkylethylene oxide adduct, and a polyoxyalkylene ether polymer compound having a perfluoroalkyl ether group in a side chain are particularly preferable because of a low foaming property. Examples of the perfluoroalkyl sulfonic acid compound include a perfluoroalkyl sulfonic acid and a perfluoroalkyl sulfonate. Examples of the perfluoroalkyl carboxylic acid compound include a perfluoroalkyl carboxylic acid and a perfluoroalkyl carboxylate. Examples of the polyoxyalkylene ether polymer compound having a perfluoroalkyl ether group in a side chain include a sulfate of a polyoxyalkylene ether polymer having a perfluoroalkyl ether group in a side chain and a salt of a polyoxyalkylene ether polymer having a perfluoroalkyl ether group in a side chain. Examples of a counter ion of a salt in these fluorine-based surfactants include Li, Na, K, $NH_4$, $NH_3CH_2CH_2OH$, $NH_2(CH_2CH_2OH)_2$, and $NH(CH_2CH_2OH)_3$.

Examples of the amphoteric surfactant include a lauryl aminopropionate, lauryl dimethyl betaine, stearyl dimethyl betaine, and lauryl dihydroxyethyl betaine.

Examples of the nonionic surfactant include a polyoxyethylene alkyl phenyl ether, a polyoxyethylene alkyl ester, a polyoxyethylene alkylamine, a polyoxyethylene alkylamide, a polyoxyethylene propylene block polymer, a sorbitan fatty acid ester, a polyoxyethylene sorbitan fatty acid ester, and an ethylene oxide adduct of acetylene alcohol.

Examples of the anionic surfactant include a polyoxyethylene alkyl ether acetate, a dodecylbenzene sulfonate, a laurate, and a polyoxyethylene alkyl ether sulfate.

The surfactants may be used singly or in combination of two or more kinds of thereof.

The silicone-based surfactant is not particularly limited and may be appropriately selected according to a purpose. However, examples thereof include a side chain-modified polydimethylsiloxane, a both-terminal-modified polydimethylsiloxane, a single terminal-modified polydimethylsiloxane, and a side chain both-terminal-modified polydimethylsiloxane. A polyether-modified silicone-based surfactant having a polyoxyethylene group or a polyoxyethylene polyoxypropylene group as a modification group is particularly preferable because of exhibiting a good property as an aqueous surfactant.

As such a surfactant, a surfactant appropriately synthesized or a commercially available product may be used. The commercially available product is available, for example, from BYK Japan KK, Shin-Etsu Chemical Co., Ltd., Dow Corning Toray Co., Ltd., Nihon Emulsion Co., Ltd., and Kyoeisha Chemical Co. Ltd.

The polyether-modified silicone-based surfactant is not particularly limited and may be appropriately selected according to a purpose. Examples thereof include a compound in which a polyalkylene oxide structure is introduced into a side chain of an Si moiety of dimethylpolysiloxane, represented by general formula (S-1).

[Chemical formula 1]

General formula (S-1)

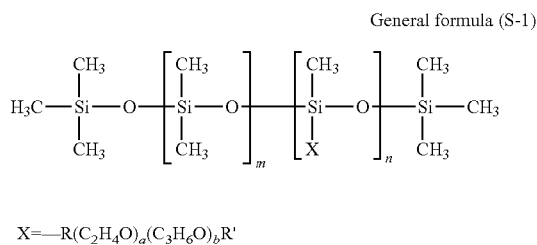

$$X\text{=}\!-\!\!R(C_2H_4O)_a(C_3H_6O)_bR'$$

(In general formula (S-1), m, n, a, and b each independently represent integers. R represents an alkylene group, and R' represents an alkyl group.)

As the polyether-modified silicone-based surfactant, a commercially available product can be used, and examples thereof include KF-618, KF-642, and KF-643 (Shin-Etsu Chemical Co., Ltd.), EMALEX-SS-5602 and SS-1906EX (Nihon Emulsion Co., Ltd.), FZ-2105, FZ-2118, FZ-2154, FZ-2161, FZ-2162, FZ-2163, and FZ-2164 (Dow Corning Toray Co., Ltd.), BYK-33 and BYK-387 (BYK Japan KK), and TSF4440, TSF4452, and TSF4453 (Toshiba Silicone Co., Ltd.).

The fluorine-based surfactant is preferably a compound having 2 to 16 fluorine-substituted carbon atoms, and more preferably a compound having 4 to 16 fluorine-substituted carbon atoms.

Examples of the fluorine-based surfactant include a perfluoroalkyl phosphate compound, a perfluoroalkylethylene oxide adduct, and a polyoxyalkylene ether polymer compound having a perfluoroalkyl ether group in a side chain.

Among these compounds, a polyoxyalkylene ether polymer compound having a perfluoroalkyl ether group in a side chain is preferable because of a low foaming property, and fluorine-based surfactants represented by general formulas (F-1) and (F-2) are particularly preferable.

[Chemical formula 2]

$$CF_3CF_2(CF_2CF_2)_m\text{—}$$
$$CH_2CH_2O(CH_2CH_2O)_nH \qquad \text{General formula (F-1)}$$

In the compound represented by the above general formula (F-1), m is preferably an integer of 0 to 10, and n is preferably an integer of 0 to 40 in order to impart water solubility.

[Chemical formula 3]

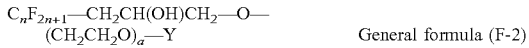

$$C_nF_{2n+1}\text{—}CH_2CH(OH)CH_2\text{—}O\text{—}$$
$$(CH_2CH_2O)_a\text{—}Y \qquad \text{General formula (F-2)}$$

In the compound represented by the above general formula (F-2), Y is H, $C_mF_{2m+1}$ in which m is an integer of 1 to 6, $CH_2CH(OH)CH_2\text{—}C_mF_{2m+1}$ in which m is an integer of 4 to 6, or $C_pH_{2p+1}$ in which p is an integer of 1 to 19. n is an integer of 1 to 6. a is an integer of 4 to 14.

The fluorine-based surfactant may be a commercially available product. Examples of the commercially available product include Surflon S-111, S-112, S-113, S-121, S-131, S-132, S-141, and S-145 (manufactured by AGC Inc.); Fluoride FC-93, FC-95, FC-98, FC-129, FC-135, FC-170C, FC-430, and FC-431 (manufactured by Sumitomo 3M); Megafac F-470, F-1405, and F-474 (manufactured by DIC Corporation); Zonyl TBS, FSP, FSA, FSN-100, FSN, FSO-100, FSO, FS-300, UR, Capstone FS-30, FS-31, FS-3100, FS-34, and FS-35 (manufactured by Chemours Company), FT-110, FT-250, FT-251, FT-400S, FT-150, and FT-400SW (manufactured by Neos Company Limited); PolyFox PF-136A, PF-156A, PF-151N, PF-154, and PF-159 (manufactured by Omnova); and Unidyne DSN-403N (manufactured by Daikin Industries, Ltd.). Among these products, FS-3100, FS-34, and FS-300 manufactured by Chemours Company, FT-110, FT-250, FT-251, FT-400S, FT-150, and FT-400SW manufactured by Neos Company Limited, Polyfox PF-151N manufactured by Omnova, and Unidyne DSN-403N manufactured by Daikin Industries, Ltd. are particularly preferable from a viewpoint of good letter printing quality, particularly remarkable improvement of a color developing property, a permeation property, a wetting property, and a uniformly dyeing property with respect to paper.

The content of a surfactant in the treatment liquid is not particularly limited and may be appropriately selected according to a purpose, but is preferably 0.001% by mass or more and 5% by mass or less and more preferably 0.05% by mass or more and 5% by mass or less.

(First Ink and Second Ink)

Each of the first ink (color ink) and the second ink (white ink) contains at least an organic solvent, may further contain a coloring material and water, and contains resin particles, a surfactant, and other components if necessary. Incidentally, as for the surfactant used for the ink, a surfactant similar to that used for the treatment liquid can be used, and therefore description thereof will be omitted.

Hereinafter, in a case where an ink is described, the ink does not distinguish the first ink (color ink) and the second ink (white ink) from each other, and items common to both thereof are described.

<Organic Solvent>

A similar type of organic solvent to that used for the treatment liquid can be used for the organic solvent in the ink.

In the present embodiment, the content ratio of the organic solvent contained in the first ink (color ink) is higher than that of the organic solvent contained in the second ink (white ink).

By setting the content of the organic solvent contained in the color ink to be larger than that of the organic solvent contained in the white ink, it is possible to prevent the organic solvent component in the white ink from promoting dissolution of the treatment layer and the color ink layer, and to obtain high laminate strength.

Note that the "content ratio of the organic solvent contained in the first ink" is the content (% by mass) of the organic solvent contained in the first ink with respect to the total amount of the first ink, and the "content ratio of the organic solvent contained in the second ink" is the content (% by mass) of the organic solvent contained in the second ink with respect to the total amount of the second ink.

The content of the organic solvent in the color ink is preferably 5% by mass or more and 50% by mass or less, and more preferably 10% by mass or more and 40% by mass or less with respect to the total amount of the color ink from viewpoints of drying property and discharge reliability.

The content of the organic solvent in the white ink is preferably 2% by mass or more and 40% by mass or less, and more preferably 5% by mass or more and 35% by mass or less with respect to the total amount of the white ink from viewpoints of drying property, discharge reliability, and laminate strength.

<Coloring Material>

The coloring material is not particularly limited, and a pigment and a dye can be used.

As the pigment, an inorganic pigment or an organic pigment can be used. These materials may be used singly or in combination of two or more kinds of thereof. A mixed crystal may also be used as the pigment.

Examples of the pigment include a black pigment, a yellow pigment, a magenta pigment, a cyan pigment, a white pigment, a green pigment, an orange pigment, a gloss color pigment such as a gold pigment or a silver pigment, and a metallic pigment.

Examples of the inorganic pigment include titanium oxide, iron oxide, calcium carbonate, barium sulfate, aluminum hydroxide, barium yellow, cadmium red, and chrome yellow, and further include carbon black manufactured by a known method such as a contact method, a furnace method, or a thermal method.

Examples of the organic pigment include an azo pigment, a polycyclic pigment (for example, a phthalocyanine pigment, a perylene pigment, a perinone pigment, an anthraquinone pigment, a quinacridone pigment, a dioxazine pigment, an indigo pigment, a thioindigo pigment, an isoindolinone pigment, or a quinophthalone pigment), a dye chelate (for example, a basic dye type chelate or an acidic dye type chelate), a nitro pigment, a nitroso pigment, and aniline black. Among these pigments, a pigment having good affinity with a solvent is preferably used. In addition, resin hollow particles and inorganic hollow particles can also be used.

Specific examples of the pigment for black include: carbon black (colour index international (C.I.) Pigment Black 7) such as furnace black, lamp black, acetylene black, or channel black; a metal such as copper, iron (C.I. Pigment Black 11), or titanium oxide; and an organic pigment such as aniline black (C.I. Pigment Black 1).

Specific examples of the pigment for colors include: C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51; C. I. Pigment Red 1, 2, 3, 5, 17, 22, 23, 31, 38, 48:2, and 48:2 (permanent red 2B (Ca)), 48:3, 48:4, 49:1, 52:2, 53:1, 57:1 (brilliant carmine 6B), 60:1, 63:1, 63:2, 64:1, 81, 83, 88, 101 (redness), 104, 105, 106, 108 (cadmium red), 112, 114, 122 (quinacridone magenta), 123, 146, 149, 166, 168, 170, 172, 177, 178, 179, 184, 185, 190, 193, 202, 207, 208, 209, 213, 219, 224, 254, and 264; C.I. Pigment Violet 1 (rhodamine lake), 3, 5:1, 16, 19, 23, and 38; C.I. Pigment Blue 1, 2, 15 (phthalocyanine blue) 15:1, 15:2, 15:3, 15:4 (phthalocyanine blue), 16, 17:1, 56, 60, and 63; and C.I. Pigment Green 1, 4, 7, 8, 10, 17, 18, and 36.

The dye is not particularly limited, and an acidic dye, a direct dye, a reactive dye, and a basic dye can be used, and these dyes may be used singly or in combination of two or more kinds of thereof.

Examples of the dye include: C.I. Acid Yellow 17, 23, 42, 44, 79, and 142; C.I. Acid Red 52, 80, 82, 249, 254, and 289; C.I. Acid Blue 9, 45, and 249; C.I. Acid Black 1, 2, 24, and 94; C.I. Food Black 1 and 2; C.I. Direct Yellow 1, 12, 24, 33, 50, 55, 58, 86, 132, 142, 144, and 173; C.I. Direct Red 1, 4, 9, 80, 81, 225, and 227; C.I. Direct Blue 1, 2, 15, 71, 86, 87, 98, 165, 199, and 202; C.I. Direct Black 19, 38, 51, 71, 154, 168, 171, and 195; C.I. Reactive Red 14, 32, 55, 79, and 249; and C.I. Reactive Black 3, 4, and 35.

The content of a coloring material in the ink is preferably 0.1% by mass or more and 15% by mass or less, and more preferably 1% by mass or more and 10% by mass or less from viewpoints of improvement of image density, good fixability, and discharge stability.

Examples of a method for dispersing a pigment to obtain an ink include a method for introducing a hydrophilic functional group into the pigment to form a self-dispersing pigment, a method for coating a surface of the pigment with a resin to disperse the pigment, and a method for dispersing the pigment using a dispersant.

Examples of the method for introducing a hydrophilic functional group into a pigment to form a self-dispersing pigment include a method for adding a functional group such as a sulfone group or a carboxyl group to a pigment (for example, carbon) to make the pigment dispersible in water.

Examples of the method for coating a surface of the pigment with a resin to disperse the pigment include a method for making a pigment encapsulated in a microcapsule to make the pigment dispersible in water. This pigment can also be referred to as a resin coated pigment. In this case, the whole pigment to be incorporated in the ink does not need to be coated with the resin. Uncoated pigment and partially coated pigment may be dispersed in the ink as long as the effect of the present embodiment is not impaired.

Examples of the method for dispersing a pigment using a dispersant include a method for dispersing a pigment using a known low molecular type dispersant or a known polymer type dispersant typified by a surfactant.

As the dispersant, for example, an anionic surfactant, a cationic surfactant, an amphoteric surfactant, a nonionic surfactant, and the like can be used depending on a pigment.

RT-100 (nonionic surfactant) manufactured by Takemoto Oil & Fat Co., Ltd. and a Na naphthalenesulfonate formalin condensate can also be suitably used as a dispersant.

The dispersants may be used singly or in combination of two or more kinds of thereof.

<Pigment Dispersion>

It is possible to obtain the ink by mixing a material such as water or an organic solvent with a pigment. It is also possible to manufacture the ink by mixing a pigment and another material such as water or a dispersant to form a pigment dispersion, and mixing a material such as water or an organic solvent therewith.

The pigment dispersion is obtained by mixing and dispersing water, a pigment, a pigment dispersant, and if necessary, another component, and adjusting a particle diameter. A disperser is preferably used for dispersion.

The particle diameter of a pigment in the pigment dispersion is not particularly limited. However, the maximum frequency in terms of the maximum number of particles is preferably 20 nm or more and 500 nm or less, and more preferably 20 nm or more and 150 nm or less from viewpoints of good dispersion stability of the pigment, high discharge stability, and high image quality such as high image density. The particle diameter of the pigment can be measured using a particle size analyzer (Nanotrac Wave-UT151, manufactured by Microtrack Bell Co., Ltd.).

The content of a pigment in the pigment dispersion is not particularly limited and may be appropriately selected according to a purpose, but is preferably 0.1% by mass or more and 50% by mass or less, and more preferably 0.1% by mass or more and 30% by mass or less from viewpoints of good discharge stability and high image density.

Preferably, if necessary, coarse particles of the pigment dispersion are filtered with a filter, a centrifugal separator, or the like, and the pigment dispersion is degassed.

<Water>

The content of water in the ink is not particularly limited and may be appropriately selected according to a purpose, but is preferably 10% by mass or more and 90% by mass or less, and more preferably 20% by mass or more and 60% by mass or less from viewpoints of ink drying property and discharge reliability.

<Resin Particles>

The type of a resin of resin particles contained in the ink is not particularly limited and may be appropriately selected according to a purpose. Examples thereof include a urethane resin, a polyester resin, an acrylic resin, a vinyl acetate resin, a styrene resin, a butadiene resin, a styrene-butadiene resin, a vinyl chloride resin, an acrylic styrene resin, and an acrylic silicone resin. These resins can be used singly or in combination of two or more kinds of thereof. Among these resins, an acrylic resin, a urethane resin, and a polyester resin are preferable.

As the resin particles, resin particles appropriately synthesized or commercially available resin particles may be used. Examples of the commercially available resin particles include Microgel E-1002 and E-5002 (styrene-acrylic resin particles, manufactured by Nippon Paint Co., Ltd.), Voncoat 4001 (acrylic resin particles, manufactured by DTC Corporation), Voncoat 5454 (styrene-acrylic resin particles, manufactured by DIC Corporation), SAE-1014 (styrene-acrylic resin particles, manufactured by Nippon Zeon Co., Ltd.), Cybinol SK-200 (acrylic resin particles, manufactured by Saiden Chemical Industry Co., Ltd.) Primal AC-22 and AC-61 (acrylic resin particles, manufactured by Rohm and Haas Company), Nanocryl SBCX-2821 and 3689 (acrylic silicone-based resin particles, manufactured by Toyo Ink Co., Ltd.), and #3070 (methyl methacrylate polymer resin particles, manufactured by Mikuni Color Ltd.).

The content of the resin particles is preferably 1% by mass or more and 30% by mass or less, and more preferably 5% by mass or more and 20% by mass or less with respect to the total amount of the ink.

The glass transition temperature of the resin particles is preferably −50° C. or higher and 100° C. or lower.

In the present embodiment, the glass transition temperature of the resin particles contained in the white ink is preferably higher than that of the resin particles contained in the color ink. In this case, excellent drying property and base material adhesion are obtained. In particular, the glass transition temperature of the resin particles contained in the white ink is more preferably higher than that of the resin particles contained in the color ink by 10° C. or more.

The volume average particle diameter of the resin particles is not particularly limited and may be appropriately selected according to a purpose. The volume average particle diameter is preferably 10 nm or more and 1,000 nm or less, more preferably 10 nm or more and 200 nm or less, and particularly preferably 10 nm or more and 100 nm or less from a viewpoint of obtaining good fixability and high image hardness.

The volume average particle diameter can be measured using, for example, a particle size analyzer (Nanotrac Wave-UT151, manufactured by Microtrac Bell Co., Ltd.).

EXAMPLES

Hereinafter, the present embodiment will be described more specifically with reference to Examples and Comparative Examples, but embodiments of the present disclosure are not limited by these Examples. Incidentally, in the following description, "parts" means "parts by mass".

(Manufacturing Example of Treatment Liquid)

The following formulation mixture was filtered through a 5 μm filter (trade name: Minisart, manufactured by Sartorius) to obtain a treatment liquid.

10 parts of 1,2-propanediol
1 part of Emulgen LS-106 (surfactant, manufactured by Kao Corporation)
1.76 parts of calcium acetate monohydrate
parts (solid content concentration 45%) of vinyl acetate-acrylic resin particles (trade name: Vinyblan 1225, manufactured by Nissin Chemical Industry Co., Ltd.)
0.1 parts of Proxel LV (preservative, manufactured by Avecia Corporation)
77.14 parts of deionized water (Manufacturing Example of Pigment Dispersion)
<Manufacturing Example of Black Pigment Dispersion>

To 3000 mL of a 2.5 N (normal) sodium hypochlorite solution, 100 g of carbon black (Black Pearls 1000) manufactured by Cabot Corporation was added and stirred at a temperature of 60° C. and a speed of 300 rpm. A reaction was caused for 10 hours to perform oxidation treatment to obtain a reaction liquid containing a pigment having a carboxylic acid group on a surface of carbon black. The resulting reaction liquid was filtered, and the filtered carbon black was neutralized with a sodium hydroxide solution and subjected to ultrafiltration to obtain a dispersion. Subsequently, ultrafiltration with a dialysis membrane was performed using the dispersion and deionized water. Ultrasonic dispersion was further performed to obtain a concentrated black pigment dispersion having a pigment solid concentration of 20% by mass.

<Manufacturing Example of Cyan Pigment Dispersion>

In a similar manner to manufacture of the black pigment dispersion except that Pigment Blue 15:4 (trade name: SMART Cyan 3154BA, manufactured by Sensient Technologies Corporation) was used in place of carbon black in manufacture of the black pigment dispersion, a cyan pigment dispersion having a pigment solid concentration of 20% by mass was obtained.

<Manufacturing Example of Magenta Pigment Dispersion>

In a similar manner to manufacture of the black pigment dispersion except that Pigment Red 122 (trade name: Pigment Red 122, manufactured by Sun Chemical Company Ltd.) was used in place of carbon black in manufacture of the black pigment dispersion, a magenta pigment dispersion having a pigment solid concentration of 20% by mass was obtained.

<Manufacturing Example of Yellow Pigment Dispersion>

In a similar manner to manufacture of the black pigment dispersion except that Pigment Yellow 74 (trade name: SMART Yellow 3074BA, manufactured by Sensient Technologies Corporation) was used in place of carbon black in manufacture of the black pigment dispersion, a yellow pigment dispersion having a pigment solid concentration of 20% by mass was obtained.

<Manufacturing Example of White Pigment Dispersion>

20 g of titanium oxide STR-100W (manufactured by Sakai Chemical Industry Co., Ltd.), 5 g of a pigment dispersant TEGO Dispers 651 (manufactured by Evonik Resource Efficiency GmbH), and 75 g of water were mixed. Zirconia beads of 0.3 mmΦ were dispersed in the resulting mixture using a bead mill (Research Lab, manufactured by Shinmaru Enterprises Corporation) at a filling ratio of 60% and 8 m/s for five minutes to obtain a white pigment dispersion having a pigment solid content concentration of 20% by mass.

(Manufacturing Example of Ink)
<Manufacturing Example of Black Ink B1>

The following raw materials were sequentially dispersed and stirred, and filtered with a membrane filter to manufacture a black ink.

15 parts of black pigment dispersion
5 parts of resin emulsion (trade name: Vinyblan ADH-893D, manufactured by Nissin Chemical Industry Co., Ltd.)
2 parts of surfactant (trade name: Softanol EP-5035, manufactured by Nippon Shokubai Co., Ltd.)
0.1 parts of preservative (Proxel LV, manufactured by Avecia Corporation)
30 parts of 1,2-propanediol
10 parts of 3-methyl-1,3-butanediol
37.9 parts of deionized water <Manufacturing Example of Cyan Ink C1>

In a similar manner to manufacture of the black ink except that a cyan pigment dispersion was used in place of the black pigment dispersion in manufacture of the black ink, a cyan ink was manufactured.

<Manufacturing Example of Magenta Ink M1>

In a similar manner to manufacture of the black ink except that a magenta pigment dispersion was used in place of the black pigment dispersion in manufacture of the black ink, a magenta ink was manufactured.

<Manufacturing Example of Yellow Ink Y1>

In a similar manner to manufacture of the black ink except that a yellow pigment dispersion was used in place of the black pigment dispersion in manufacture of the black ink, a yellow ink was manufactured.

<Manufacturing Example of Black Ink B2>

In a similar manner to manufacture of the black ink B1 except that the content ratios of the organic solvent and water were changed in manufacture of the black ink B1, black ink B2 was manufactured.

<Manufacturing Example of Cyan Ink C2>

In a similar manner to manufacture of the cyan ink C1 except that the content ratios of the organic solvent and water were changed in manufacture of the cyan ink C1, cyan ink C2 was manufactured.

<Manufacturing Example of Magenta Ink M2>

In a similar manner to manufacture of the magenta ink M1 except that the content ratios of the organic solvent and water were changed in manufacture of the magenta ink M1, magenta ink M2 was manufactured.

<Manufacturing Example of Yellow Ink Y2>

In a similar manner to manufacture of the yellow ink Y1 except that the content ratios of the organic solvent and water were changed in manufacture of the yellow ink Y1, yellow ink Y2 was manufactured.

<Manufacturing Example of White Ink W-1>

The following raw materials were sequentially dispersed and stirred, and filtered with a membrane filter to manufacture white ink W-1.

40 parts of white pigment dispersion
2 parts of resin emulsion (trade name: Vinyblan ADH-893D, manufactured by Nissin Chemical Industry Co., Ltd.)
2 parts of surfactant (trade name: Softanol EP-5035, manufactured by Nippon Shokubai Co., Ltd.)
0.1 parts of preservative (Proxel LV, manufactured by Avecia Corporation)
25 parts of 1,2-propanediol
7 parts of 3-methyl-1,3-butanediol
23.9 parts of deionized water <Manufacturing Example of White Ink W-2>

The following raw materials were sequentially dispersed and stirred, and filtered with a membrane filter to manufacture white ink W-2.

40 parts of white pigment dispersion
2 parts of resin emulsion (trade name: Vinyblan ADH-893D, manufactured by Nissin Chemical Industry Co., Ltd.)
2 parts of surfactant (trade name: Softanol EP-5035, manufactured by Nippon Shokubai Co., Ltd.)
0.1 parts of preservative (Proxel LV, manufactured by Avecia Corporation)
20 parts of 1,2-propanediol
5 parts of 3-methyl-1,3-butanediol
30.9 parts of deionized water <Manufacturing Example of White Ink W-3>

The following raw materials were sequentially dispersed and stirred, and filtered with a membrane filter to manufacture white ink W-3.

40 parts of white pigment dispersion
2 parts of resin emulsion (trade name: Vinyblan ADH-893D, manufactured by Nissin Chemical Industry Co., Ltd.)
2 parts of surfactant (trade name: Softanol EP-5035, manufactured by Nippon Shokubai Co., Ltd.)
0.1 parts of preservative (Proxel LV, manufactured by Avecia Corporation)
30 parts of 1,2-propanediol
10 parts of 3-methyl-1,3-butanediol
15.9 parts of deionized water <Manufacturing Example of White Ink W-4>

The following raw materials were sequentially dispersed and stirred, and filtered with a membrane filter to manufacture white ink W-4.

40 parts of white pigment dispersion
2 parts of resin emulsion (trade name: Vinyblan ADH-893D, manufactured by Nissin Chemical Industry Co., Ltd.)
2 parts of surfactant (trade name: Softanol EP-5035, manufactured by Nippon Shokubai Co., Ltd.)
0.1 parts of preservative (Proxel LV, manufactured by Avecia Corporation)
35 parts of 1,2-propanediol
15 parts of 3-methyl-1,3-butanediol
5.9 parts of deionized water Formulations of the color inks and the white ink are illustrated in Tables 1, 2, and 3. Note that the numerical values in Tables are represented in terms of parts by mass.

TABLE 1

| Color ink | Black B1 | Cyan C1 | Magenta M1 | Yellow Y1 |
|---|---|---|---|---|
| Black pigment dispersion | 15 | | | |
| Cyan pigment dispersion | | 15 | | |
| Magenta pigment dispersion | | | 15 | |
| Yellow pigment dispersion | | | | 15 |
| Resin emulsion: Vinyblan ADH-893D | 5 | 5 | 5 | 5 |
| Surfactant: Softanol EP-5035 | 2 | 2 | 2 | 2 |
| Preservative: Proxel LV | 0.1 | 0.1 | 0.1 | 0.1 |
| 1,2-Propanediol | 30 | 30 | 30 | 30 |
| 3-Methyl-1,3-butanediol | 10 | 10 | 10 | 10 |
| Deionized water | 37.9 | 37.9 | 37.9 | 37.9 |
| Sum | 100 | 100 | 100 | 100 |

TABLE 2

| Color ink | Black B2 | Cyan C2 | Magenta M2 | Yellow Y2 |
|---|---|---|---|---|
| Black pigment dispersion | 15 | | | |
| Cyan pigment dispersion | | 15 | | |
| Magenta pigment dispersion | | | 15 | |
| Yellow pigment dispersion | | | | 15 |
| Resin emulsion: Vinyblan ADH-893D | 5 | 5 | 5 | 5 |
| Surfactant: Softanol EP-5035 | 2 | 2 | 2 | 2 |
| Preservative: Proxel LV | 0.1 | 0.1 | 0.1 | 0.1 |
| 1,2-Propanediol | 35 | 35 | 35 | 35 |
| 3-Methyl-1,3-butanediol | 15 | 15 | 15 | 15 |
| Deionized water | 27.9 | 27.9 | 27.9 | 27.9 |
| Sum | 100 | 100 | 100 | 100 |

TABLE 3

| White ink | W-1 | W-2 | W-3 | W-4 |
|---|---|---|---|---|
| White pigment dispersion | 40 | 40 | 40 | 40 |
| Resin emulsion: Vinyblan ADH-893D | 2 | 2 | 2 | 2 |
| Surfactant: Softanol EP-5035 | 2 | 2 | 2 | 2 |
| Preservative: Proxel LV | 0.1 | 0.1 | 0.1 | 0.1 |
| 1,2-Propanediol | 25 | 20 | 30 | 35 |
| 3-Methyl-1,3-butanediol | 7 | 5 | 10 | 15 |
| Deionized water | 23.9 | 30.9 | 15.9 | 5.9 |
| Sum | 100 | 100 | 100 | 100 |

Examples 1 to 6 and Comparative Examples 1 to 5

The manufactured black, cyan, magenta, and yellow inks were filled in ink containers of a remodeled machine of an inkjet recording apparatus (trade name: VC-60000, manufactured by Ricoh Co., Ltd.), respectively, and printing was performed. The remodeled machine of the inkjet recording apparatus was remodeled so as to have a similar configuration to that in FIG. 1. Using the remodeled machine of the inkjet recording apparatus, continuous printing was performed under the following printing conditions.

The printing conditions in Examples and Comparative Examples are illustrated below. The printing conditions are also illustrated in Table 4.
<Printing Conditions>
Printing length: 2000 m
Printing speed: 50 m/min
Resolution: 1200×1200 dpi
Printed image: A white ink was superimposed and formed on solid images of black, cyan, magenta, and yellow
Non-permeable base material: OPP 20 μm film (trade name: Pylen P2161, manufactured by Toyobo Co., Ltd.)
Corona treatment device: discharge amount 20 W·min/m$^2$
Treatment liquid applying device: roll coater
Treatment liquid: treatment liquid used in the Manufacturing Examples
Inkjet head: inkjet heads corresponding to black, cyan, magenta, yellow, and white inks, respectively
Microdrive condition in non-discharging nozzle (vibrating condition of ink interface in nozzle): 2 kHz (output of 20% with respect to piezoelectric voltage at the time of discharge)
Heater (third heating device) after treatment with treatment liquid before treatment with color ink: any one of the following

[1] Warm air drying (warm air temperature 80° C.)
[2] Far infrared heater (surface capacity density of heat generating portion 4 W/m$^2$, trade name: Hirex Heater HHS1275, manufactured by Hachiko Denki Co., Ltd.)
Heater (first heating device) after treatment with color ink before treatment with white ink: any one of the following
[1] Far infrared heater (surface capacity density of heat generating portion 4 W/m$^2$, trade name: Hirex Heater HHS1275, manufactured by Hachiko Denki Co., Ltd.)
[2] Warm air drying (warm air temperature 80° C.) Heater (second heating device) after treatment with white ink: any one of the following
[1] Warm air drying (warm air temperature 80° C.)
[2] Drying with drum having temperature controllable (drum temperature 80° C.) and warm air facing the drum (warm air temperature 80° C.)
[3] Drying with drum having temperature controllable (drum temperature 70° C.) and warm air facing the drum (warm air temperature 100° C.)
Color ink: black, cyan, magenta, and yellow inks used in the Manufacturing Examples
White ink: Any of white inks W-1 to W-4 used in the Manufacturing Examples
(Evaluation)

Next, printing in the Examples 1 to 6 and the Comparative Examples 1 to 5 was performed. Thereafter, a printed image and laminate strength characteristic at the time of start of printing, and a printed image and laminate strength characteristic at the time of completion of printing for 2000 m were evaluated according to the following method and evaluation criteria. The results are illustrated in Table 4.
<Image Evaluation>

A printed image at the time of start of printing and a printed image at the time of completion of printing for 2000 m were visually observed and evaluated according to the following criteria. A case where evaluation was B or higher was judged to be practically usable.
[Evaluation Criteria]
A: No abnormality is observed.
B: No abnormality can be observed visually, but print streaks can be observed with a loupe.
C: Streaks can be observed visually in a part of an image.
D: Streaks and density unevenness can be observed visually in the whole of an image.
<Laminate Strength Evaluation>

A dry laminate adhesive (main agent TM-320/curing agent CAT-13B, manufactured by Toyo Morton Co., Ltd.) was applied onto a printed image with a bar coater, CPP (Pylen P1128 manufactured by Toyobo Co., Ltd.) was bonded thereto, and then aging was performed at 40° C. for 48 hours. The bonded film was cut into a width of 15 mm. Thereafter, peeling strength was measured, and evaluation was performed according to the following criteria. Evaluation of B or higher is in an allowable range.
[Evaluation Criteria]
A: Strength of 5 N/15 mm or more can be obtained.
B: Strength of 3 N/15 mm or more and less than 5 N/15 mm can be obtained.
C: Strength of 1 N/15 mm or more and less than 3 N/15 mm can be obtained.
D: Only strength of less than 1 N/15 mm can be obtained.

TABLE 4

| | Apparatus | Treatment liquid | Heating after treatment liquid before color ink | Color ink | Heating after color ink before white ink | White ink |
|---|---|---|---|---|---|---|
| Example 1 | FIG. 1 | Used | Warm air 80° C. | B1C1M1Y1 | Infrared heater | W-1 |
| Example 2 | FIG. 1 | Used | Warm air 80° C. | B1C1M1Y1 | Infrared heater | W-2 |
| Example 3 | FIG. 1 | Used | Warm air 80° C. | B2C2M2Y2 | Infrared heater | W-3 |
| Example 4 | FIG. 2 | Used | Warm air 80° C. | B1C1M1Y1 | Infrared heater | W-2 |
| Example 5 | FIG. 2 | Used | Warm air 80° C. | B1C1M1Y1 | Infrared heater | W-2 |
| Example 6 | FIG. 3 | Used | Infrared heater | B1C1M1Y1 | Infrared heater | W-2 |
| Comparative Example 1 | FIG. 1 | Not used | Warm air 80° C. | B1C1M1Y1 | Infrared heater | W-1 |
| Comparative Example 2 | FIG. 1 | Used | Warm air 80° C. | B1C1M1Y1 | Not drying | W-1 |
| Comparative Example 3 | FIG. 4 | Used | Warm air 80° C. | B1C1M1Y1 | Warm air 80° C. | W-1 |
| Comparative Example 4 | FIG. 1 | Used | Warm air 80° C. | B1C1M1Y1 | Infrared heater | W-3 |
| Comparative Example 5 | FIG. 1 | Used | Warm air 80° C. | B1C1M1Y1 | Infrared heater | W-4 |

| | Heating after white ink | Image quality - Printing start time | Image quality - Printing completion time | Laminate strength - Printing start time | Laminate strength - Printing completion time |
|---|---|---|---|---|---|
| Example 1 | Warm air 80° C. | A | A | B | B |
| Example 2 | Warm air 80° C. | A | A | B | B |
| Example 3 | Warm air 80° C. | A | A | B | B |
| Example 4 | Drum temperature 80° C. and warm air 80° C. | A | A | A | B |
| Example 5 | Drum temperature 70° C. and warm air 100° C. | A | A | A | A |
| Example 6 | Warm air 80° C. | A | A | A | A |
| Comparative Example 1 | Warm air 80° C. | D | D | D | D |
| Comparative Example 2 | Warm air 80° C. | A | A | D | D |
| Comparative Example 3 | Warm air 80° C. | A | C | C | C |
| Comparative Example 4 | Warm air 80° C. | A | A | C | C |
| Comparative Example 5 | Warm air 80° C. | A | A | D | D |

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. A line head type liquid discharge apparatus comprising:
a treatment liquid applying device to apply a treatment liquid to a non-permeable base material;
a first discharging device to discharge a first ink containing an organic solvent onto the non-permeable base material to which the treatment liquid has been applied;
a heating device to heat, with an infrared ray, the non-permeable base material onto which the first ink has been discharged; and
a second discharging device to discharge a second ink containing an organic solvent onto the non-permeable base material heated by the heating device,
a content ratio of the organic solvent contained in the first ink being higher than a content ratio of the organic solvent contained in the second ink.

2. The liquid discharge apparatus according to claim 1, wherein the first ink is a color ink and the second ink is a white ink.

3. The liquid discharge apparatus according to claim 1, further comprising another heating device to heat the non-permeable base material onto which the second ink has been discharged, wherein said another heating device includes a drum having a surface whose temperature is adjustable and an air blower facing the drum via the non-permeable base material.

4. The liquid discharge apparatus according to claim 3, wherein the air blower has a temperature higher than the temperature of the surface of the drum.

5. The liquid discharge apparatus according to claim 1, further comprising another heating device to heat, before discharge of the first ink, the non-permeable base material to which the treatment liquid has been applied, wherein said another heating device heats, with an infrared ray, the non-permeable base material to which the treatment liquid has been applied.

6. The liquid discharge apparatus according to claim 1, wherein the non-permeable base material has a water absorption amount of 10 mL/m$^2$ or less from a start of contact until a time point of 30 msec$^{1/2}$ in a Bristow method.

7. The liquid discharge apparatus according to claim 1, wherein a printing speed is 30 m/min to 100 m/min.

8. The liquid discharge apparatus according to claim 1, wherein the treatment liquid contains a nonionic aqueous emulsion.

9. A line head type liquid discharge method comprising:

applying a treatment liquid to a non-permeable base material;

discharging a first ink containing an organic solvent onto the non-permeable base material to which the treatment liquid has been applied;

heating, with an infrared ray, the non-permeable base material onto which the first ink has been discharged; and discharging a second ink containing an organic solvent onto the non-permeable base material heated by the heating, a content ratio of the organic solvent contained in the first ink being higher than a content ratio of the organic solvent contained in the second ink.

* * * * *